United States Patent
Hsu

(10) Patent No.: US 8,531,788 B2
(45) Date of Patent: Sep. 10, 2013

(54) LENS DEVICE

(75) Inventor: Chiao-Sen Hsu, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 13/584,923

(22) Filed: Aug. 14, 2012

(65) Prior Publication Data
US 2013/0083408 A1 Apr. 4, 2013

(30) Foreign Application Priority Data
Oct. 3, 2011 (TW) .............................. 100135766 A

(51) Int. Cl.
*G02B 7/02* (2006.01)
*G02B 15/14* (2006.01)

(52) U.S. Cl.
USPC ........... 359/823; 359/819; 359/694; 359/698; 359/699; 396/87; 396/144

(58) Field of Classification Search
USPC ................. 359/811, 819, 822–824, 694–701; 348/207.99, 335, 360, 362, 374; 396/72–77, 396/87, 137, 144, 505, 529, 542; 369/44.14, 369/44.23, 44.27, 47.1, 53.19, 53.23, 53.28
See application file for complete search history.

(56) References Cited

U.S. PATENT DOCUMENTS

| | | | | |
|---|---|---|---|---|
| 5,812,889 | A * | 9/1998 | Nomura et al. | 396/87 |
| 7,339,756 | B2 * | 3/2008 | Tengeiji et al. | 359/811 |
| 7,446,960 | B2 * | 11/2008 | Morinaga | 359/819 |
| 7,446,962 | B2 * | 11/2008 | Matsumoto et al. | 359/819 |
| 7,710,668 | B2 * | 5/2010 | Shimizu et al. | 359/819 |
| 7,826,734 | B2 * | 11/2010 | Shirono et al. | 396/85 |
| 8,018,661 | B2 * | 9/2011 | Ito | 359/696 |
| 8,369,024 | B2 * | 2/2013 | Tsuchiya et al. | 359/696 |

* cited by examiner

*Primary Examiner* — Loha Ben
(74) *Attorney, Agent, or Firm* — Trop, Pruner & Hu, P.C.

(57) ABSTRACT

A lens device includes a main body unit, a guiding shaft unit, a lens unit, a focus adjusting unit and a resilient component. The guiding shaft unit includes three parallel guiding shafts disposed in the main body unit. The lens unit includes a lens frame disposed in the main body unit and having three guiding portions that receive slidably and respectively the guiding shafts, and a lens mounted co-movably in the lens frame. The focus adjusting unit is disposed in the main body unit and includes a driven member abutting against the lens frame and driven by a driving member for driving the lens unit to slide along the guiding shafts. The resilient component is disposed for biasing resiliently the lens frame toward the driven member.

10 Claims, 5 Drawing Sheets

LENS DEVICE

CROSS-REFERENCE TO RELATED APPLICATION

This application claims priority of Taiwanese Application No. 100135766, filed on Oct. 3, 2011.

BACKGROUND OF THE INVENTION

1. Field of the Invention

The invention relates to a lens device, more particularly to an impact-resistant lens device.

2. Description of the Related Art

A lens moving mechanism employed in a camera generally includes, as illustrated in U.S. Pat. No. 7,710,668, U.S. Patent Application Publication No. 2009/0207300, U.S. Pat. No. 5,812,889, U.S. Pat. No. 7,339,756 and U.S. Patent Application Publication No. 2007/0177046, a lens unit, a threaded shaft, and a motor for rotating the threaded shaft to drive the lens unit to move along two parallel guiding shafts. The lens moving mechanism may only include one guiding shaft as illustrated in, for example, U.S. Pat. No. 7,446,960.

However, when the lens moving mechanism is subjected to an impact, the guiding shafts may be deformed by an impact force exerted thereon, thereby damaging the lens unit.

SUMMARY OF THE INVENTION

Therefore, the object of the present invention is to provide an impact-resistant lens device. Accordingly, a lens device of the present invention includes a main body unit, a guiding shaft unit, a lens unit, a focus adjusting unit and a resilient component. The guiding shaft unit includes three parallel guiding shafts that are spaced apart from one another and that are disposed in the main body unit. The lens unit includes a lens frame that is disposed in the main body unit and that has three guiding portions receiving slidably and respectively the guiding shafts, and a lens that is mounted co-movably in the lens frame. The focus adjusting unit is disposed in the main body unit and includes a driving member and a driven member that abuts against the lens frame. The driving member is operable to drive movement of the driven member for driving the lens unit to slide along the guiding shafts. The resilient component is disposed between the main body-unit and the lens frame for biasing resiliently the lens frame toward the driven member.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
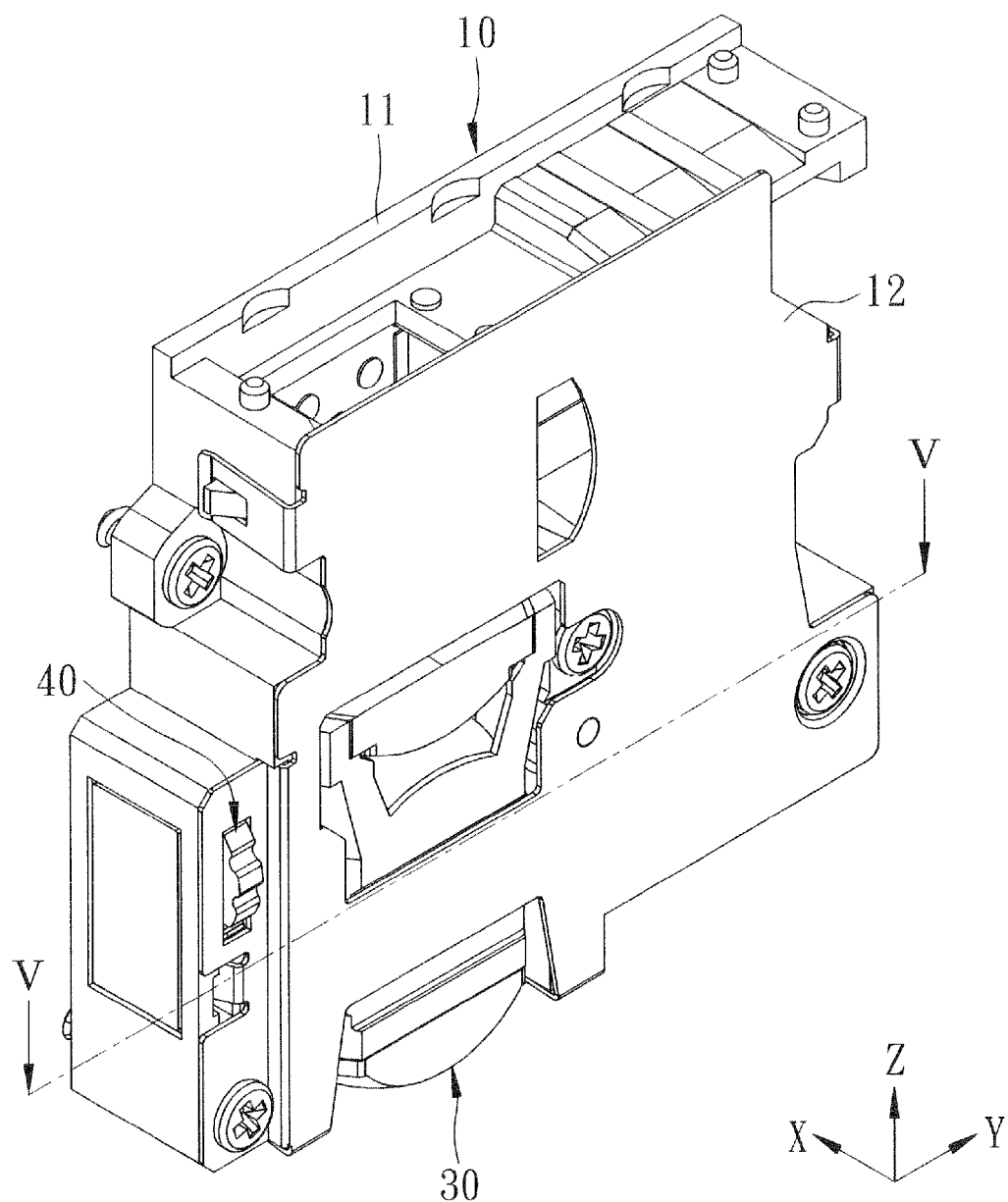
FIG. 1 is an assembled perspective view of a preferred embodiment of a lens device according to the invention.
Figure 2:
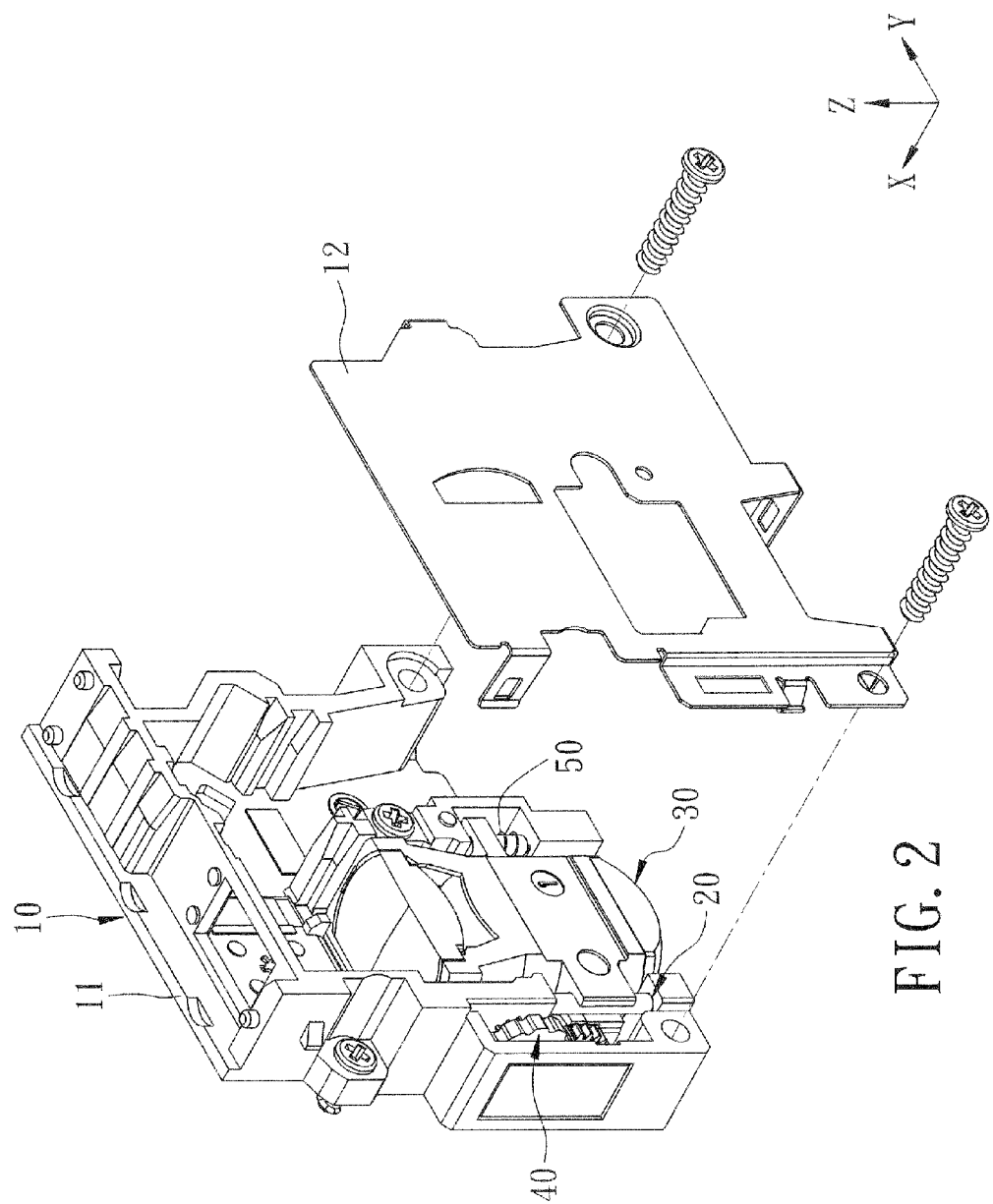
FIG. 2 is a partly exploded perspective view of the preferred embodiment.

As shown in FIGS. 1 and 2, the preferred embodiment of a lens device according to the present invention includes a main body unit 10, a guiding shaft unit 20, a lens unit 30, a focus adjusting unit 40 and a resilient component 50.

The main body unit 10 includes a base seat 11 and a cover member 12 coupled to the base seat 11.

Figure 3:
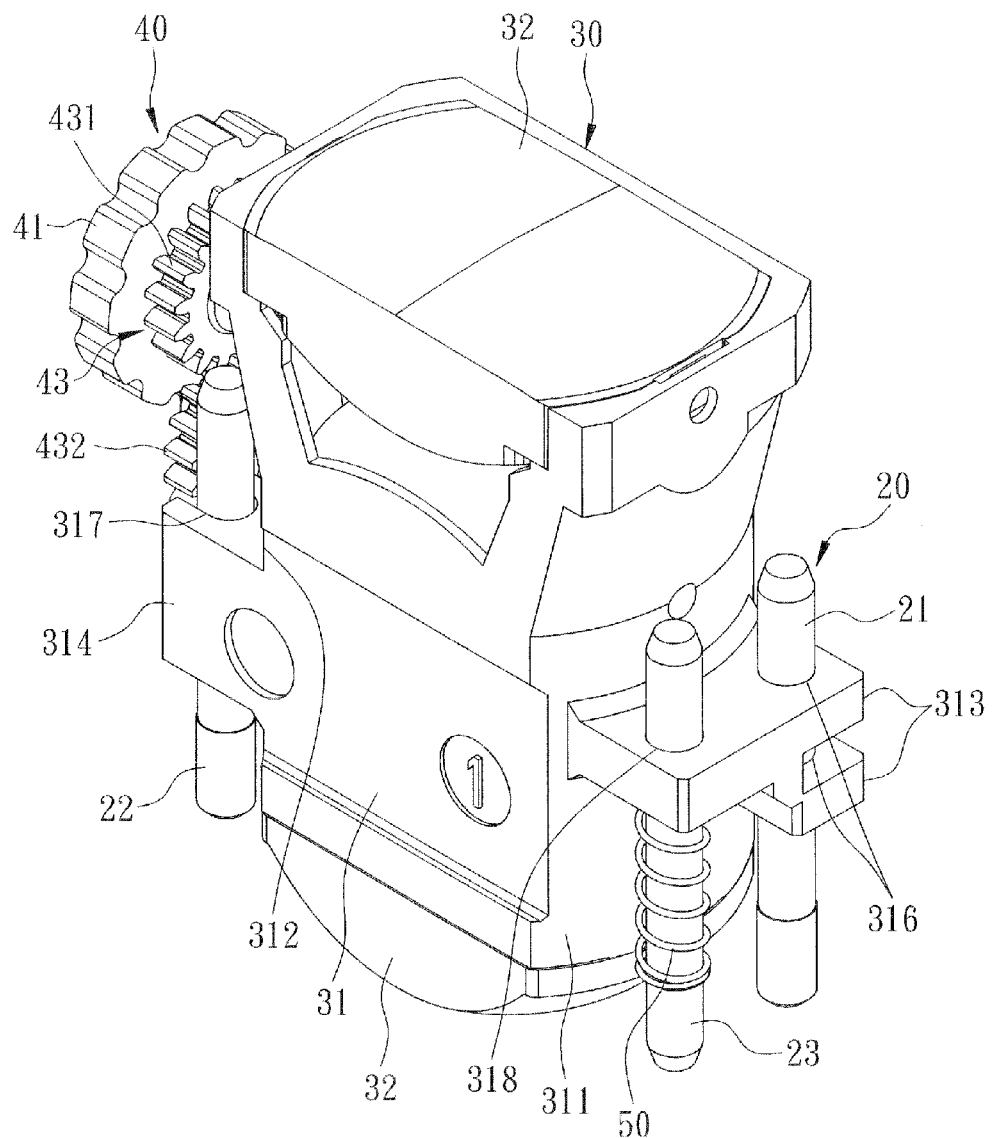
FIG. 3 is a perspective view of a guiding shaft unit, a lens unit, a focus adjusting unit and a resilient component of the preferred embodiment.
Figure 4:
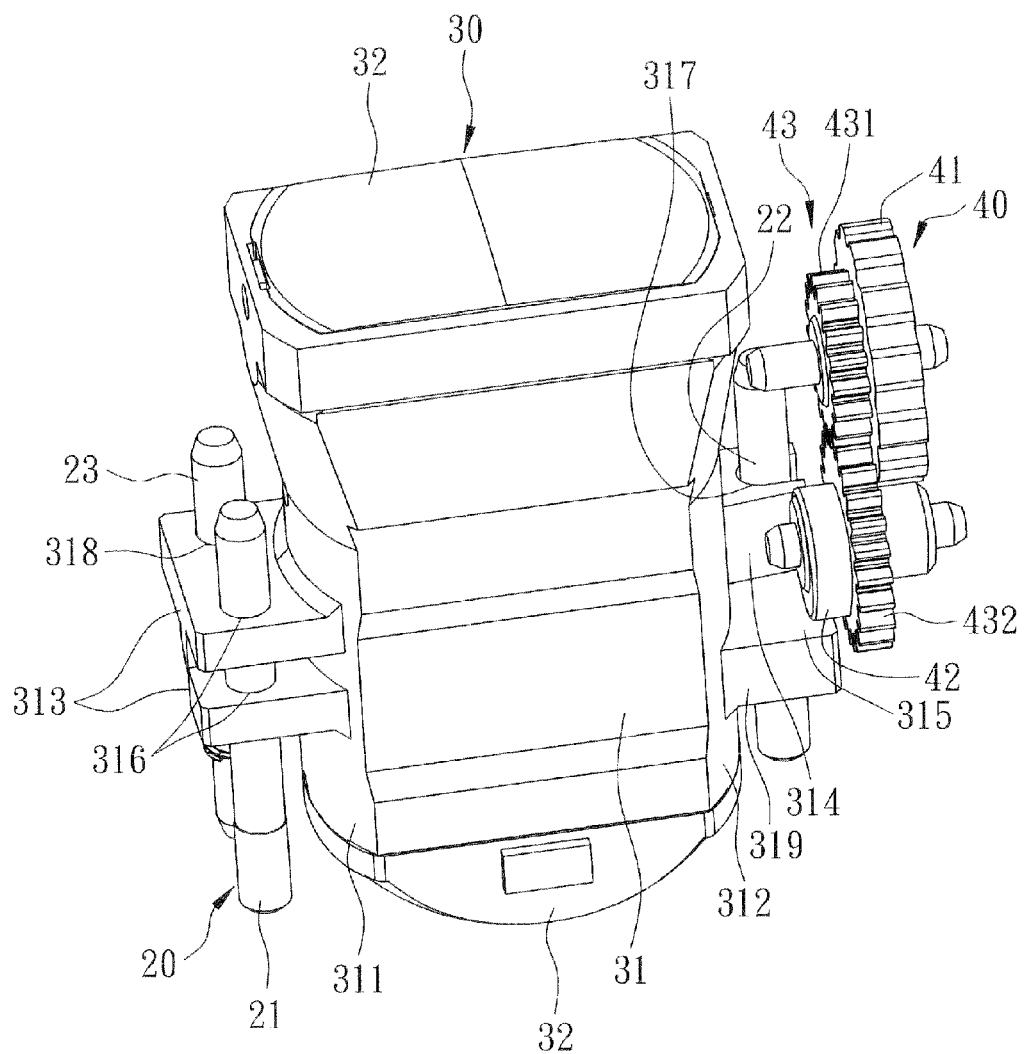
FIG. 4 is another perspective view of the guiding shaft unit, the lens unit, the focus adjusting unit and the resilient component of the preferred embodiment.
Figure 5:
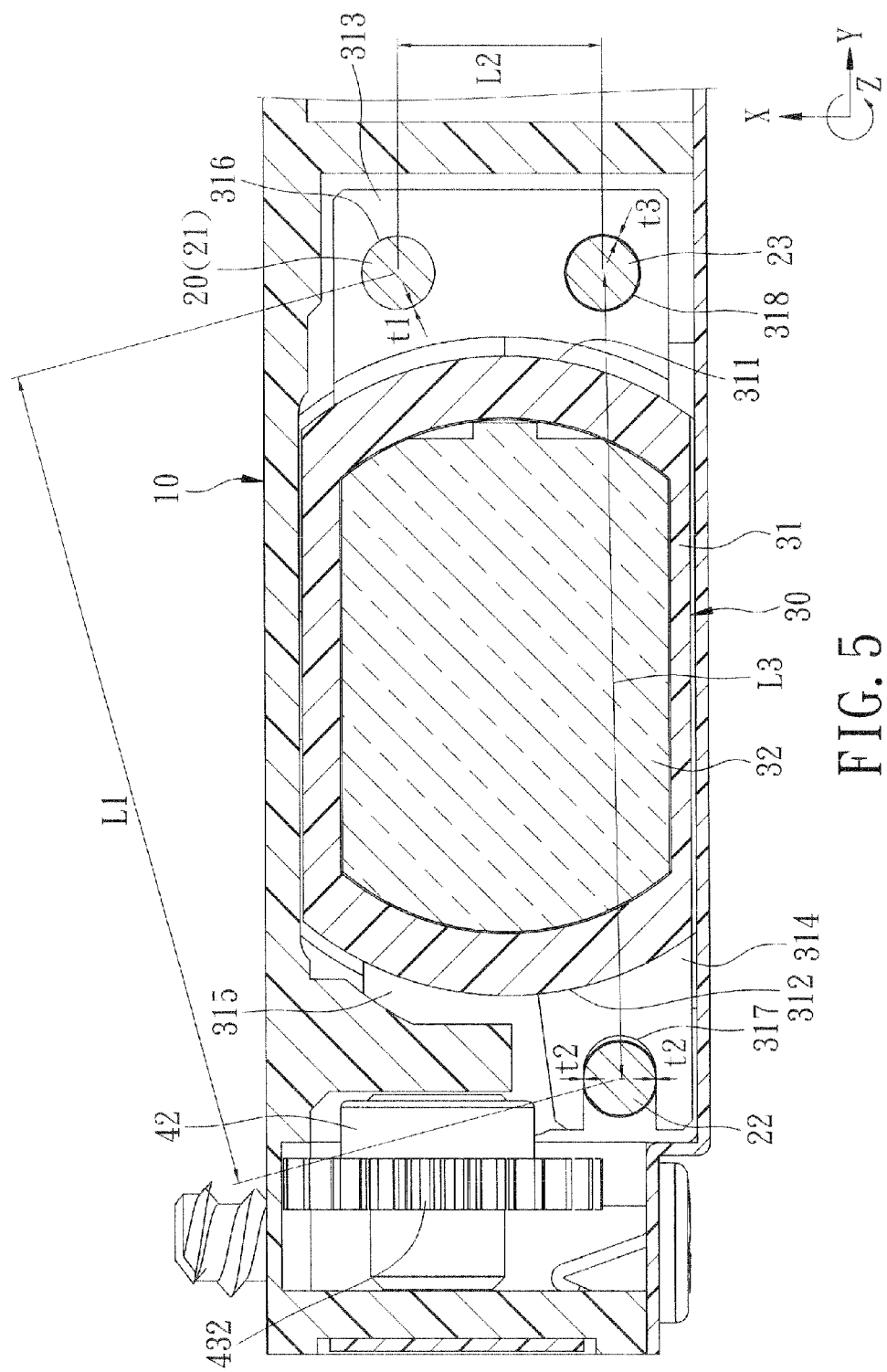
FIG. 5 is a sectional view of the preferred embodiment taken along line V-V in FIG. 1.

As shown in FIGS. 3, 4 and 5, the guiding shaft unit 20 includes three parallel guiding shafts 21, 22, 23 that are spaced apart from one another and that are disposed in the base seat 11 of the main body unit 10.

In this preferred embodiment, the guiding shafts 21, 22, 23 include a primary guiding shaft 21, a secondary guiding shaft 22 and a tertiary guiding shaft 23. The primary guiding shaft 21 is spaced apart from the tertiary guiding shaft 23 in a first direction (X), and the tertiary guiding shaft 23 is spaced apart from the secondary guiding shaft 22 in a second direction (Y) transverse to the first direction (X). The primary, secondary and tertiary guiding shafts 21, 22, 23 extend in a third direction (Z) that is transverse to the first, and second directions (X, Y). A distance between the primary and secondary guiding shafts 21, 22 is defined as a first distance (L1), a distance between the primary and tertiary guiding shafts 21, 23 is defined as a second distance (L2), and a distance between the secondary and tertiary guiding shafts 22, 23 is defined as a third distance (L3). The first distance (L1) is greater than the second and third distances (L2, L3).

The lens unit 30 includes a lens frame 31 that is disposed in the base seat 11 of the main body unit 10, and at least a lens 32 that is mounted co-movably in the lens frame 31.

The lens frame 31 of the lens unit 30 has opposite first and second lateral surfaces 311, 312. The primary and tertiary guiding shafts 21, 23 are disposed adjacent to the first lateral surface 311, and the secondary guiding shaft 22 is disposed adjacent to the second lateral surface 312. The lens frame 31 further has first and second receiving lugs 313, 314 that are disposed respectively on the first and second lateral surfaces 311, 312, and a projecting member 319 that is disposed on the second lateral surface 312 and that has an abutment portion 315 distal from the second lateral surface 312.

The lens frame 31 further has three guiding portions 316, 317, 318 that receive slidably and respectively the primary guiding shaft 21, the secondary guiding shaft 22 and the tertiary guiding shaft 23. The guiding portions 316, 317, 318 include a primary guiding portion 316 that is formed in the first receiving lug 313, a secondary guiding portion 317 that is formed in the second receiving lug 314, and a tertiary guiding portion 318 that is formed in the first receiving lug 313. In this embodiment, the first receiving lug 313 has two layers at a location corresponding to the primary guiding shaft 21, and one layer at a location corresponding to the tertiary guiding shaft 23. The primary guiding portion 316 is in the form of two concentric round holes that are formed respectively in the two layers of the first receiving lug 313. The secondary guiding portion 317 is in the form of a U-shaped notch that is formed in the second receiving lug 314. The tertiary guiding portion 318 is in the form of a round hole that is formed in the first receiving lug 313. Additionally, the primary guiding portion 316 is spaced apart from the primary guiding shaft 21 in radial directions of the primary guiding shaft 21 by a first radial distance (t1), the secondary guiding portion 317 is spaced apart from corresponding portions of the secondary guiding shaft 22 in the first direction (X) by a second radial distance (t2), and the tertiary guiding portion 318 is spaced apart from the tertiary guiding shaft 23 in radial directions of the tertiary guiding shaft 23 by a third radial distance (t3). The third radial distance (t3) is greater than the first and second radial distances (t1, t2). Preferably, the third radial distance (t3) is 0.1 millimeter, and each of the first and second radial distances (t1, t2) is 0.01 millimeter.

As shown in FIGS. 2, 3 and 4, the focus adjusting unit 40 is disposed in the base seat 11 of the main body unit 10 and includes a driving member 41, a driven member 42 and a reduction gear mechanism 43 interconnecting the driving member 41 and the driven member 42.

In this embodiment, the driving member 41 is configured as a dial mounted rotatably in the base seat 11. The driven member 42 is configured as a cam disposed rotatably in the base seat 11 and abutting against the abutment portion 315 of the projecting member 319 of the lens frame 31. The abutment portion 315 is configured as a cam follower and abuts against the driven member 42, such that rotation of the driven member 42 drives the lens unit 30 to slide in the third direction (Z). The reduction gear mechanism 43 includes a small gear 431 connected coaxially to the driving member 41 and a large gear 432 connected coaxially to the driven member 42 and meshing with the small gear 431.

The resilient component 50 is disposed between the base seat 11 of the main body unit 10 and the first receiving lug 313 of the lens frame 31 for biasing resiliently the abutment portion 315 of the lens frame 31 toward the driven member 42. In this embodiment, the resilient component 50 is configured as a compression spring and is sleeved on the tertiary guiding shaft 23.

As such, when a user turns the driving member 41, the driven member 42 is driven to rotate by virtue of the reduction gear mechanism 43, thereby moving the lens frame 31 together with the lens 32 in the third direction (Z) along the primary, secondary and tertiary guiding shafts 21, 22, 23 via the abutment of the abutment portion 315 against the driven member 42 so as to initiate the focus-adjusting process.

To sum up, the advantages of the present invention are as follows:

1. Since the first distance (L1) between the primary and secondary guiding shafts 21, 22 is configured to be larger than the second distance (L2) between the primary and tertiary guiding shafts 21, 23 and the third distance (L3) between the secondary and tertiary guiding shafts 22, 23, the primary guiding shaft 21, the secondary guiding shaft 22 and the tertiary guiding shaft 23 form an impact-resistant triangular structure (see FIG. 5) that has a relatively high rigidity. Therefore, damage to the guiding shaft unit 20 and the lens unit 30 due to an impact can be alleviated.

2. Moreover, the presence of the first radial distance (t1), the second radial distance (t2) and the third radial distance (t3) reduces friction between the lens frame 31 and the guiding shaft unit 20 during the movement of the lens frame 31. The arrangement that the third radial distance (t3) is greater than the first and second radial distances (t1, t2) also facilitates the assembling of the lens frame 31 to the primary guiding shaft 21, the secondary guiding shaft 22 and the tertiary guiding shaft 23.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A lens device comprising:
   a main body unit;
   a guiding shaft unit including three parallel guiding shafts that are spaced apart from one another and that are disposed in said main body unit;
   a lens unit including a lens frame that is disposed in said main body unit and that has three guiding portions receiving slidably and respectively said guiding shafts, and a lens that is mounted co-movably in said lens frame;
   a focus adjusting unit disposed in said main body unit, and including a driving member and a driven member that abuts against said lens frame, said driving member being operable to drive movement of said driven member for driving said lens unit to slide along said guiding shafts; and
   a resilient component disposed between said, main body unit and said lens frame for biasing resiliently said lens frame toward said driven member.

2. The lens device as claimed in claim 1, wherein:
   said driven member of said focus adjusting unit is configured as a cam disposed rotatably in said main body unit; and
   said lens frame has an abutment portion configured as a cam follower and abutting against said driven member, such that rotation of said driven member drives the sliding movement of said lens unit along said guiding shafts.

3. The lens device as claimed in claim 2, wherein said driving member of said focus adjusting unit is configured as a dial mounted rotatably in said main body unit.

4. The lens device as claimed in claim 3, wherein said focus adjusting unit further includes a reduction gear mechanism interconnecting said driving member and said driven member.

5. The lens device as claimed in claim 1, wherein said resilient component is configured as a compression spring.

6. The lens device as claimed in claim 1, said resilient component is sleeved on one of said guiding shafts.

7. The lens device as claimed in claim 1, wherein:
   said lens frame of said lens unit further has opposite first and second lateral surfaces that are respectively distal from and proximate to said focus adjusting unit; and
   said three guiding shafts include a primary guiding shaft adjacent to said first lateral surface, a secondary guiding shaft adjacent to said second lateral surface, and a tertiary guiding shaft adjacent to said first lateral surface.

8. The lens device as claimed in claim 7, wherein a distance between said primary and secondary guiding shafts is defined as a first distance, a distance between said primary and tertiary guiding shafts is defined as a second distance, and a distance between said secondary and tertiary guiding shafts is defined as a third distance, said first distance being greater than said, second and third distances.

9. The lens device as claimed in claim 7, wherein said guiding portions of said lens frame include a primary guiding portion formed on said first lateral surface of said lens frame and receiving slidably said primary guiding shaft, a secondary guiding portion formed on said second lateral surface of said lens frame and receiving slidably said secondary guiding shaft, and a tertiary guiding portion formed on said first lateral surface and receiving slidably said tertiary guiding shaft.

10. The lens device as claimed in claim 9, wherein:
   said primary guiding shaft is spaced apart from said tertiary guiding shaft in a first direction, and said secondary guiding shaft is spaced apart from said tertiary guiding shaft in a second direction transverse to the first direction; and
   said primary guiding portion of said lens frame is spaced apart from said primary guiding shaft in radial directions of said primary guiding shaft by a first radial distance, said secondary guiding portion of said lens frame is spaced apart from corresponding portions of said secondary guiding shaft in the first direction by a second radial distance, and said tertiary guiding portion of said lens frame is spaced apart from said tertiary guiding shaft in radial directions of said tertiary guiding shaft by a third radial distance, said third radial distance being greater than the first and second radial distances.

* * * * *